United States Patent [19]

Nagasaki et al.

[11] 3,767,528

[45] Oct. 23, 1973

[54] PROCESS FOR THE MANUFACTURE OF 3,4-DISUBSTITUTED PHENYL-L-ALANINES

[75] Inventors: Tomohisa Nagasaki; Masanori Sugita, both of Kawagoe; Kunio Nakagawa; Hiroyasu Koyama, both of Tokyo, all of Japan

[73] Assignee: Nisshin Flour Milling Co., Ltd., Tokyo, Japan

[22] Filed: Sept. 27, 1971

[21] Appl. No.: 184,208

[30] Foreign Application Priority Data
Sept. 30, 1970 Japan.............................. 45/85092

[52] U.S. Cl. .................................................. 195/30
[51] Int. Cl. ............................................ C12d 13/06
[58] Field of Search ..................... 195/2, 28, 29, 30, 195/47, 36, 37, 51

[56] References Cited
UNITED STATES PATENTS
3,290,225   12/1966   Rauenbusch et al. ................ 195/29

FOREIGN PATENTS OR APPLICATIONS
2,041,418   2/1971   Germany .............................. 195/30

OTHER PUBLICATIONS

Fairhurst et al., "J. Gen. Microbiol." Vol. 15, p. 106–120, 1956.

Aronson et al., "Chem. Abs.," Vol. 64, No. 8663a, 1966

*Primary Examiner*—Lionel M. Shapiro
*Attorney*—Thomas B. Van Poole et al.

[57]   ABSTRACT

3, 4-Disubstituted phenyl-L-alanines (including "L-dopa") prepared by transamination of corresponding 3, 4-disubstituted phenyl pyruvic acid and an amino radical donor. Selected bacteria, moulds and yeasts provide the transaminase.

13 Claims, No Drawings

PROCESS FOR THE MANUFACTURE OF 3,4-DISUBSTITUTED PHENYL-L-ALANINES

The present invention relates to a process for the manufacture of 3,4-disubstituted phenyl-L-alanines, more particularly to a process for the manufacture of 3,4-disubstituted phenyl-L-alanines by a microorganisms.

3,4-dihydroxy phenyl-L-alanine (hereinafter referred to as "L-dopa") has been known as a specific pharmaceuticals for Parkinson's disease.

3-methoxy-4-hydroxphenyl-L-alanine and 3,4-dimethoxyphenyl-L-alanine are an important industrial starting material for the production of "L-dopa" and a pharmaceutical action of these compounds will be expected.

It has been known that 3,4-disubstituted phenyl-L-alanine represented by the general formula:

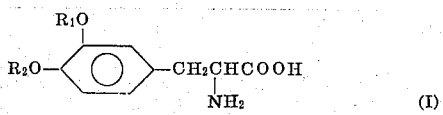

wherein $R_1$ and $R_2$, same or different, stand for hydrogen atom or methyl group provided that when $R_1$ stands for hydrogen atom $R_2$ does not stand for methyl group have been hithertobefore manufactured by a physical and chemical methods or an optical resolution methods using enzymes, for a mixture 3,4-disubstituted phenyl-L-alanine (hereinafter referred to as "L-type" and 3,4-disubstituted phenyl-D-alanine (hereinafter referred to as "D-type") which are chemically synthesized. In the case of the optical resolution method, however, the yield of "L-type" of more than 50 percent can not be obtained unless "D-type" which is obtained as a by-product is converted into "L-type" by a racemization. Therefore the practice of the optical resolution method is very disadvantageous for an industrial scale.

As the process for obtaining "L-dopa" by a fermentation there are proposed a process wherein L-tyrosine derivatives, for example N-formyl-L-tyrosine is acted with fungal polyphenol oxidase (Charles J. Sih et al. "Journal of the American Chemical Society" 91, 6204 (1969)) and a process wherein catechol is condensed with a special amino acid, for example tyrosine, serine, cysteine and the like by the use of tyrosine phenol lyase which can be obtained from bacterium. (Yamada, Ogata et al. "Biochemical and Biophysical Research Communications" 34, 266 (1969)).

As a result of the search of microorganisms having an ability for converting 3,4-disubstituted phenyl pyruvic acids into 3,4-disubstituted phenyl-L-alanines, we have found that the transaminase which can catalyze a transamination reaction between 3,4-disubstituted phenyl pyruvic acid and amino acid can be produced by the use of enzymes of microorganisms having an ability for the transamination between the 3,4-disubstituted phenyl pyruvic acid and the amino radical donor, said microorganisms are selected from the group consisting of bacteria belonging to Pseudomonas, Alcaligenes, Bacillus, Micrococcus, Sarcina, Mycobacterium, Nocardia, Brevibacterium, Staphylococcus, Arthrobacter, Gluconobacter and Achromobactergenera; moulds belonging to Aspergillus, Penicillium, Mucor, Helicostylum and Trametes genera and yeasts belong to Rhodotorula, Candida and Saccharomyces genera.

On the basis of the above discovery and further investigations, we advantageously and industrially succeeded in the production of 3,4-disubstituted phenyl-L-alanine represented by the general formula (I).

According to the present invention, therefore, there is provided a process for preparing 3,4-disubstituted phenyl-L-alanine represented by the general formula:

wherein $R_1$ and $R_2$, same or different, stand for hydrogen atom and methyl radical provided that when $R_1$ stands for hydrogen atom $R_2$ does not stand for methyl radical, characterized in that 3,4-disubstituted phenyl pyruvic acid represented by the general formula:

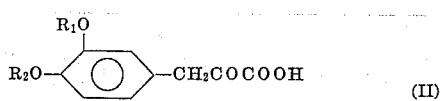

wherein $R_1$ and $R_2$ have same meanings as above is transaminated with an amino radical donor by the use of enzymes of microorganisms which can catalyze the transamination reaction between the 3,4-disubstituted phenyl pyruvic acid and the amino radical donor, said microorganisms are selected from the group consisting of bacteria belonging to Pseudomonas, Alcaligenes, Bacillus, Micrococcus, Sarcina, Mycobacterium, Nocardia, Brevibacterium, Staphylococcus, Arthrobacter, Gluconobacter and Achromobacter genera; mould belonging to Aspergillus, Penicillium, Mucor, Helicostylum and Trametes genera and yeast belonging to Rhodotorula, Candida and Saccharomyces genera.

In the practice of the process of present invention, one of bacteria, moulds or yeasts as described above is cultured in a culture medium containing one or more of glucose, sucrose, maltose, lactose, starch hydrolysate and the like as the carbon source; and one or more of meat extract, peptone, polypeptone, casamino acid, corn steep liquor, ammonium salts, protein hydrolysates and the like as the nitrogen source; and one or more of sodium chloride, phosphate, metallic ion, vitamin and growth accelerating agent at a temperature of 25° to 40° C for 20–120 hours to obtain an enzyme of which the compounds represented by the general formula (II) can be converted into the compounds represented by the general formula (I) in the cell of the bacteria or yeasts or the mycelium of moulds, or in their fermentration broths in a great amount.

Although these optimum fermentation conditions may be varied according to the kind of microorganisms, the results of tests for the producibility of the products in these microorganisms are as follows:

In the case of bacteria, the bacteria are inoculated into the culture medium consisting of 0.5 percent by weight of meat extract, 0.1 percent by weight of peptone, and 0.5 percent by weight of sodium chloride and is cultured at the temperature of 30° C for 48 hours. In the presence of the obtained wet cell, the compounds represented by the general formula (II) is reacted with amino acid at the temperature of 37° C for one hour. In the case of mould and yeast, the mould or yeast is inoculated into the culture medium consisting of 2.5 percent by weight of malt extract and is cultured in same conditions as described above and the obtained cell or mycelium is ground by a glass homogenizer to obtain an enzyme solution. In the presence of the enzyme solution, the compounds represented by the general formula (II) are reacted with amino acid in same conditions as described above.

The produced compounds represented by the general formula (I) are quantitatively determined by the following method, respectively.

3,4-dihydroxyphenyl-L-alanine is estimated by the trihydroxyindol method as described in the literature [Euler, U.S. von : Hormones in Blood. Academic Press (1961)].

3,4-dimethoxyphenyl-L-alanine and 3-methoxy-4-hydroxyphenyl-L-alanine are converted into N-trifloroacetyl-n-butyl ester by the process as described in the literature [Charles W. Grehek et al. "Analytical Chemistry" 37, (3), 383, (1965) ]. The N-trifloroacetyl-n-butyl ester which is thus obtained respectively is quantitatively determined by a gas-liquid chromatography. From these analytical results, the enzyme activities of microorganisms which are obtained from bacteria, moulds or yeasts is respectively determined.

The results obtained by the determination of the enzyme activities are shown in Tables I, II and III.

In Tables I, II and III, one unit of enzyme activities is expressed by the amount of the enzyme which produces 1 mg of the compound represented by the general formula (I) at the temperature of 37° C for one hour. As the enzyme reaction system, there was used one in which the enzyme solution resulting from 1 ml of the cultured solution is added with the solution having the following composition:

| 0.5 M | Phosphate buffer solution | 0.5 ml |
| 0.01% (W/V) | Pyridoxal phosphate | 0.5 ml |
| 1/16 M | Potassium-L-glutamate | 0.5 ml |
| 1/16 M | Potassium-L-aspartate | 0.5 ml |
| 1/8 M | Compound represented by the general formula (II) | 1.0 ml | and the whole amount was made to be 5 ml.

In Tables I, II and III, "Compound (A)," "Compound (B)" and "Compound (C)" show 3,4-dihydroxy-phenyl-L-alanine, 3-methoxy-4-hydroxyphenyl-L-alanine and 3,4-dimethoxyphenyl-L-alanine, respectively.

The amount of enzyme which was produced in 100 ml of the fermentation broth for various bacteria, moulds and yeasts is expressed by the above difined unit number.

TABLE I.—ENZYME AMOUNT OF THE PRODUCT OBTAINED FROM BACTERIA

| | | Enzyme amount (units/100 ml.) | | |
|---|---|---|---|---|
| Name of bacteria | Classification number | Compound (A) | Compound (B) | Compound (C) |
| Pseudomonas aeruginosa | IAM [1] 1007 | 62 | 31 | 58 |
| Psedomonas dachunhae | IAM [1] 1048 | 56 | 45 | 40 |
| Pseudomonas desmolytica | IAM [1] 1508 | 42 | 41 | 41 |
| Pseudomonas fluorescens | IFO [1] 3903 | 39 | 10 | 22 |
| Pseudomonas azotoformans | IAM 1603 | 54 | 22 | 41 |
| Pseudomonas ovalis | IAM 1002 | 44 | 39 | 46 |
| Pseudomonas melanogonum | IAM 1554 | 55 | 40 | 23 |
| Bacillus cereus | IAM 1029 | 11 | 17 | 19 |
| Alcaligenes faecalis | IAM 1015 | 98 | 53 | 69 |
| Micrococcus varians | IAM 1314 | 21 | 29 | 28 |
| Micrococcus lysodeikticus | IAM 1056 | 36 | 26 | 20 |
| Barcina lutea | IAM 1099 | 15 | 10 | 12 |
| Brevibacterium ammoniagenes | ATCC [3] 6872 | 14 | 10 | 16 |
| Nocardia corallina | IFO 3338 | 14 | 13 | 16 |
| Mycobacterium phlei | IFO 3158 | 16 | 13 | 17 |
| Staphylococcus aureus | IAM 1011 | 20 | 20 | 25 |
| Arthrobacter simplex | IAM 1660 | 43 | 38 | 35 |
| Gluconobactor suboxydans | IAM 1828 | 27 | 10 | 18 |
| Achromobacter cycloclastes | IAM 1013 | 58 | 26 | 37 |

[1] Institute of Applied Microbiology, University of Tokyo, Tokyo, Japan.
[2] Institute for Fermentation, Osaka, Japan.
[3] American Type Culture Collection, 12301 Parklawn Drive, Rockville, Maryland 20852, U.S.A.

TABLE II.—ENZYME AMOUNT OF THE PRODUCT OBTAINED FROM MOULDS

| | | Enzyme amount (units/100 ml.) | | |
|---|---|---|---|---|
| Name of moulds | Classification number | Compound (A) | Compound (B) | Compound (C) |
| Aspergillus oryzae | IAM 2600 | 30 | 22 | 27 |
| Aspergillus fumigatus | IAM 2004 | 18 | 10 | 14 |
| Aspergillus flavus | IAM 2007 | 33 | 17 | 16 |
| Penicillium ochro-chloron | IAM 7099 | 29 | 40 | 39 |
| Penicillium thomii | IAM 7006 | 17 | 10 | 12 |
| Penicillium expansum | IAM 7229 | 46 | 30 | 24 |
| Penicillim duclauxi | IAM 7010 | 51 | 18 | 50 |
| Penicillium cyclopium | IAM 7146 | 69 | 53 | 66 |
| Penicillium roqueforti | IAM 7241 | 13 | 42 | 35 |
| Penicillium notatum | IAM 7367 | 30 | 15 | 14 |
| Helicostylum piriforme | IAM 6228 | 34 | 23 | 28 |
| Trametes pini | IAM 9007 | 16 | 10 | 20 |
| Mucor racemosus | IAM 6123 | 54 | 46 | 48 |

TABLE III.—ENZYME AMOUNT OF PRODUCT OBTAINED FROM YEASTS

| | | Enzyme amount (units/100 ml.) | | |
|---|---|---|---|---|
| Name of yeasts | Classification number | Compound (A) | Compound (B) | Compound (C) |
| Rhodotorula glutinis | IFO 0667 | 12 | 18 | 10 |
| Candida guilliermondii | IAM 4412 | 15 | 12 | 16 |
| Saccharomyces cerevisiae | IAM 4195 | 10 | 22 | 17 |

As described above, many microorganisms yield forcely the transaminase which can convert the compounds represented by the general formula (II) into the compounds represented by the general formula (I) by the transamination reaction, hence it is very benefitable that the transaminase can be applied for an industrial process for the preparation of the compounds represented by the general formula (I). In this case, the ground cell or mycelium liquid, dried cell or mycelium, wet cell or mycelium of these microorganisms or the fermentation broth of these microorganisms can be applied for the transamination reaction as the transaminase. Also the microorganisms of which a great amount of transaminase are discharged outside of bacterial cell, such as Pseudomonas dachunhae can be found and this can be used by the salting-out of it with ammonium sulphate. The transaminase thus prepared can convert the compounds represented by the general formula (II) into the compounds represented by the general formula (I) in the presence of the amino radical donor.

The preferable temperature, pH value and reaction time in which the process of the present invention is carried out are 25° to 45° C, 6.5 to 10.5 and 20 to 60 hours, respectively.

As examples of the amino radical donor which may be used in the practice of the process of present invention, there are mentioned L-glutamic acid, L-alanine, L-aspartic acid, glycine or mixture thereof, peptone and protein hydrolysates such as wheat protein hydrolysate.

The compounds represented by the general formula (I) which are obtained as explained above can be very easily recovered by acidifying the reaction solution with a mineral acid, removing cell or mycelium and soluble protein from the reaction solution, extracting an unreacted keto acid with organic solvents such as ethyl acetate and thereafter by concentrating the resultant purified solution and then by using an isoelectric point precipitation, ion-exchange resins or adsorbents.

Among the obtained compounds represented by the general formula (I), 3-methoxy-4-hydroxyphenyl-L-alanine or 3,4-dimethoxyphenyl-L-alanine can be converted into L-dopa having the optical purity of 100 percent in a high yield by a conventional demethylation procedure of it.

The present invention is illustrated by the following nonlimitive examples in which percentages are by weight.

EXAMPLE 1

Alcaligenes faecalis IAM 1015 was inoculated into 5 litres of culture medium consisting of 0.5 percent of glucose, 0.5 percent of casamino acid, 0.5 percent of yeast extract, 0.1 percent of sodium chloride, 0.1 percent of monopotassium phosphate and 0.05 percent of magnesium sulphate and was cultivated with an agitation and aeration at the starting pH value of 7.0 and at the temperature of 30° C for 64 hours. Bacterial cell was separated by a centrifugation from the culture liquid. 35 g of the obtained wet cell were suspended in 300 ml of the solution which was regulated to the pH value of 7.5 by dissolving 3 g of 3,4-dihydroxyphenyl pyruvic acid, 3 g of L-glutamic acid and 3 g of L-aspartic acid into an aqueous ammonia and then was maintained at the temperature of 30° C with an agitation. After 18 hours, cell and also protein were removed from the reaction liquid and then the reaction liquid was applied to an active charcoal. The adsorbed "L-dopa" was eluted with water and then the elute was concentrated and thereafter permitted to stand in a cold place to obtain 1.4 g of crude crystals of 3,4-dihydroxyphenyl-L-alanine. 1.0 g of pure "L-dopa" was obtained by a recrystallization of the crude "L-dopa" from water. Infrared absorption spectrum and thin-layer chromatography of it showed that the pure "L-dopa" corresponded to the standard product.

$(\alpha)_D^{12} = -13.2°$ ($C = 3.86$ in 1 N-HCl, $l = 1$)

Example 2

Pseudomonas dachunhae IAM 1048 was inoculated into 10 litres of culture medium consisting of 2 percent of glucose and 1 percent of corn steep liquor and was cultivated with an agitation and aeration at the starting pH value of 7.0 and at the temperature of 30° C for 70 hours. Cell was seperated by a centrifugation from the culture liquid. Using 36 g of the obtained wet cell a transamination reaction and purification were carried out as in Example 1 to obtain 0.75 g of "L-dopa." On the other hand, 7 kg of ammonium sulphate were added to about 10 litres of the culture liquid and the culture liquid was permitted to stand for 2 hours and then the precipitated protein was filtered off and the protein was dialyzed to obtain an enzyme solution. Th enxyme solution thus obtained was combined with the solution in which 3 g of 3,4-dihydroxyphenyl pyruvic acid, 3 g of aspartic acid were dissolved in aqueous ammonia to regulate the pH value of the solution to 7.4 so as to make the whole quantity to be 300 ml, and the whole was maintained at the temperature of 30° C for 25 hours. After the reaction was carried out, a protein was separated from the solution and the solution was purified as described in Example 1 to obtain 0.62 g of pure crystals of "L-dopa." Infrared absorption spectrum and thin-layer chromatography of the crystals showed that the crystal corresponded to the standard product.

$(\alpha)_D^{12} = -13.0°$ ($C = 3.98$, in 1 N-HCl, $l = 1$)

EXAMPLE 3

Candida guilliermondii IAM 4412 was inoculated into 5 litres of the culture medium as shown in Example 2 and was cultivated with an agitation and aeration at the starting pH value of 5.0 and at the temperature of 30° C for 67 hours. The cell which was separated from the culture medium by a centrifugation was ground on a glass-homogenizer to obtain an enzyme solution. This enzyme solution was combined with a solution in which 3 g of 3,4-dihydroxyphenyl pyruvic acid, 3 g of L-glutamic acid and 3 g of L-aspartic acid were dissolved in an aqueous ammonia to regulate to the pH value of 7.4 so as to make the whole quantity to be 300 ml. A transamination reaction and purification was carried out as described in Example 1 to obtain 0.33 g of pure crystals of "L-dopa." Infrared adsorption spectrum and thin-laymer chromatography of the crystal showed that the crystal corresponded to the standard product.

$(\alpha)_D^{12} = -12.6°$ ($C = 2.65$, in 1 N-HCl $l = 1$)

Example 4

Alcaligenes faecalis IAM 1015 was inoculated into 400 ml of culture medium consisting of 1.0 percent of glucose, 3.0 percent of polypeptone, 0.3 percent of sodium chloride, 0.15 percent of potassium phosphate and 0.01 percent of magnesium sulphate and was cultivated with an agitation at the starting pH value of 7.0 and at the temperature of 30° C for 48 hours. The culture liquid was combined with 2 litres of the solution in which 12.0 g of 3,4-dimethoxyphenyl pyruvic acid, 6.5 g of glutamic acid and 6.5 g of L-aspartic acid were dissolved in 1N aqueous potassium hydroxide solution to regulate to the pH value of 8.3 and the obtained solution was maintained at the temperature of 30° C with an agitation for 40 hours and thereafter the pH value of the solution was regulated to 2.5 with 10 percent aqueous hydrochloric acid solution and was centrifuged. The obtained supernatant solution was concentrated under a reduced pressure until the whole volume is reached to about 600 ml. The obtained solution was washed 2 times with about 300 ml of ethyl acetate solution to extract and recover unreacted 3,4-dimethoxyphenyl pyruvic acid. The aqueous layer was concentrated up to about 300 ml and thereafter was regulated its pH value to 4.5 and was admitted to stand overnight to obtain 7.5 g of crude crystals of 3,4-dimethoxyphenyl-L-alanine. The remaining 3,4-dimethoxyphenyl-L-alanine in the mother liquor was adsorbed on active charcoal and the adsorbate was eluted with water and the elute was concentrated and thereafter admitted to stand in a cool place to recover 1.8 g of the crude cyrstals.

The purity of these crude crystals were found to be 89 percent and 94 percent by a gas chromatography, respectively. These crude crystals were dissolved in 100 ml of about 2 percent aqueous hydrochloric acid solution and washed with ethyl acetate to obtain white crystals and thereafter the white crystals were recrystallized 2 times by an isoelectric point precipitation method. The obtained white crystals were further recrystallized from water to obtain 5.5 g of a pure 3,4-dimethoxyphenyl-L-alanine crystals which were ascertained by a thin-laymer chromatography and gas chromatography.

Physical and chemical properties of the obtained crystals were as follows:

| | |
|---|---|
| Melting point | 203.0° to 209.9°C (decomposition) |
| Optical rotation | $[\alpha]_D^{26} = -5.75°$ (C=3.30, in 1 N-HCl, $l=1$) |
| Infrared absorption spectrum (nujol mull) | 3230 ($NH_3^+$) 2150–2800, 1610 ($COO^-$) [$cm^{-1}$] |

The crystals were treated with hydrobromic acid and then demethylated to obtain "L-dopa" of the optical purity of 100 percent.

$$(\alpha)_D^{26} = -12.7° \ (C = 3.56, \text{ in } 1 \text{ N-HCl}, l = 1)$$

EXAMPLE 5

*Penicillium cyclopium IAM* 7146 was inoculated into 1 litre of culture medium consisting of 2.0 percent of glucose and 1.0 percent of corn steep liquor and was cultivated with an agitation at the starting pH value of 5.0 and at the temperature of 30° C for 90 hours and the mycelium obtained was filtered off from the culture liquid. 12 g of the obtained mycelium were ground by a homogenizer to obtain an enzyme solution. Thus obtained enzyme solution were combined with the solution in which 6.5 g of 3,4-dimethoxyphenyl pyruvic acid, 6.5 g of L-glutamic acid and 6.5 g of aspartic acid were dissolved in 1N aqueous potassium hydroxide solution and the pH value was regulated to 8.5, and the whole volume was made to be 2.5 litres and was maintained at the temperature of 30° C with an agitation for 36 hours. The pH value of the obtained solution was regulated to 8.3 with the use of 1N aqueous potassium hydroxide solution and 10 percent aqueous hydrochloric acid solution during the reaction.

The mycelium and protein were removed from the reaction solution by a centrifugation and the solution was purified by the process as described in Example 4 to obtain 2.9 g of pure 3,4-dimethoxyphenyl-L-alanine.

The infrared absorption spectrum and melting point of the pure crystals corresponded to those of the product obtained in Example 1.

$$(\alpha)_D^{25.5} = -5.92 \ (C = 4.88, \text{ in } 1 \text{ N-HCl}, l = 1)$$

EXAMPLE 6

*Alcaligenes faecalis IAM* 1015 was inculated into 500 ml of culture medium consisting of 1.0 percent of glucose, 3.0 percent of polypeptone, 0.3 percent of sodium chloride, 0.15 percent of potassium phosphate and 0.01 percent of magnesium sulphate and was cultivated with an agitation at the starting pH value of 7.0 and at the temperature of 30° C for 48 hours. The culture liquid was combined with 2 litres of the solution in which 15.0 g of 3-methoxy-4-hydroxyphenyl pyruvic acid, 15.0 g of L-glutamic acid and 15.0 g of L-aspartic acid were dissolved in 1N aqueous potassium hydroxide solution to regulate the pH value to 8.5 and the obtained solution was maintained at the temperature of 30° C with an agitation for 20 hours and thereafter the pH value of the solution was regulated to 2.5 with 10 percent aqueous hydrochloric acid solution and was centrifuged. The obtained supernatant solution was concentrated under a reduced pressure until the whole volume was reached to about 300 ml. After the obtained solution was filtered and the filtrate was washed 2 times with same amount of ethyl acetate as that of the filtrate to extract and recover 3-methoxy-4hydroxyphenyl pyruvic acid. The pH value of the aqueous layer was regulated to 4.5 and the aqueous layer was admitted to stand overnight in a cool place to obtain 5.2 g of crude crystals of 3-methoxy-4-hydroxyphenyl-L-alanine. The purity of the crystals was 90 percent by a gas chromatography determination. The crystals were dissolved in 100 ml of about 2 percent aqueous hydrochloric acid solution and washed with ethyl acetate. The above-treated crystals were recrystallized 2 times by an isoelectric point precipitation method to obtain pure white crystals. The pure white crystals was further recrystallized from water to obtain 3.6 g of thin-layer chromatographic and gas chromatographic pure crystals of 3-methoxy-4-hydroxyphenyl-L-alanine.

Physical and chemical properties of these crystals were as follows:

| | |
|---|---|
| Melting point | 208°–212°C (decomposition) |
| Optical rotation | $[\alpha]_D^{25} = -5.60$ (C=3.05 1 N HCl, $l=1$) |
| Infrared absorption spectrum (nujol mull) | 3280 ($NH_3^+$), 1627 ($COO^-$) [$cm^{-1}$] |

These crystals were treated with hydrobromic acid and then demethylated to obtain "L-dopa" of the optical purity of 100 percent.

$[\alpha]_D^{25} = -12.3°$  (C=3.56 1 N HCl, $l=1$)

EXAMPLE 7

*Pseudomonas melanogonum IAM* 1554 was inculated into 500 ml of culture medium consisting of 0.2 percent of glucose, 0.5 percent of casamino acid, 0.5 percent of yeast extract, 0.3 percent of dipotassium phosphate and 0.1 percent of monopotassium phosphate and was cultivated with an agitation at the starting pH value of 7.0 and at the temperature of 30° C for 48 hours. The culture liquid was combined with the solution in which 15.0 g of 3-methoxy-4-hydroxyphenyl pyruvic acid, 15.0 g of L-glutamic acid and 15.0 g of L-aspartic acid were dissolved in 1N aqueous potassium hydroxide solution to regulate the pH value to 8.3 and the obtained solution was added with 1.0 mg of pyridoxal phosphate and the whole volume was made to be 2.5 litres and the whole was maintained at the temperature of 30° C. After 40 hours, 4.8 g of 3-methoxy-4-hydroxyphenyl-L-alanine which was a pure crystal were recovered as described in Example 6. The infrared absorption spectrum and melting point of the pure crystal corresponded to those of the product obtained in Example 1.

$$(\alpha)_D^{25} = -5.63° \ (C = 3.07 \ 1 \ N \ HCl, l = 1)$$

We claim:

1. A process for preparing 3,4-disubstituted phenyl-L-alanines represented by the general formula:

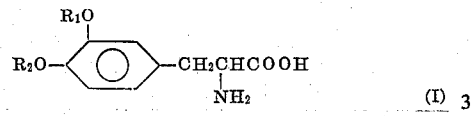

wherein $R_1$ is a hydrogen atom or methyl radical, $R_2$ is a hydrogen atom when $R_1$ is a hydrogen atom and $R_2$ is a methyl radical when $R_1$ is a hydrogen atom or methyl radical, which comprises the step of
reacting 3,4-disubstituted phenyl pyruvic acids represented by the general formula;

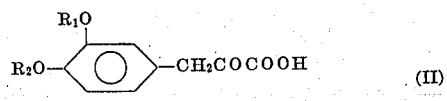

wherein $R_1$ and $R_2$ are as defined above with at least an amino radical donor and transaminating said 3,4-disubstituted phenyl pyruvic acid with an enzyme capable of effecting said transamination between the 3,4-disubstituted phenyl pyruvic acid and said amino radical donor to yield said a. bacteria taken from the group consisting essentially of Pseudomonas, Alcaligones, Bacillus, Micrococcus, Sarcina, Mycobacterium, Nocardia, Brevibacterim, Staphylococcus, Arthrobacter, Gluconobacter and Achromobacter genera; or 3,4-disubstituted phenyl-L-alanines, said enzyme being produced from any one of the following microorganisms:

b. molds taken from the group consisting essentially of Aspergillus, Penicillium, Mucor, Helicostylum and Trametes genera; or c. yeasts taken from the group consisting essentially of Rhodotorula, Candida and Saccharomyces genera.

2. A process as claimed in claim 1 wherein the amino radical donor is L-glutamic acid, L-alanine, L-aspartic acid, gylcine, peptones and protein hydrolysates and mixture thereof.

3. A process as claimed in claim 1 wherein the bacterium is Alcaligenes faecalis.

4. A process as claimed in claim 1 wherein the bacterium is Pseudomonas dachunhae.

5. A process as claimed in claim 1 wherein the bacterium is Pseudomonas melanogenum.

6. A process as claimed in claim 1 wherein the mould is Penicillium cyclopium.

7. A process as claimed in claim 1 wherein the yeast is Candida guilliermondii.

8. A process as claimed in claim 1 wherein the transamination is carried out under conditions that the temperature, pH value and reaction time are 25° to 45° C, 6.5 to 10.5 and 20 to 60 hours, respectively.

9. A process as claimed in claim 1 wherein said enzyme is produced by bacteria which is selected from the group consisting essentially of Alcaligones, Mycobacterium, Norcardia, Staphylococcus Arthrobacter, Gluconobacter and Achromobacter.

10. A process as claimed in claim 1 wherein said enzyme is produced by fungi taken from the group consisting essentially of Helicostylum and Trametes.

11. A process as claimed in claim 1 wherein said enzyme is produced by the yeast of Rhodotorula.

12. A process as claimed in claim 1 wherein said enzyme is produced by the fungal specie Heliscostylum piriforme.

13. A process as claimed in claim 11 wherein said enzyme is produced by the yeast specie Rhodotorula glutines.

* * * * *